United States Patent
Aberle et al.

(10) Patent No.: US 7,419,591 B2
(45) Date of Patent: *Sep. 2, 2008

(54) FILTER CARTRIDGE WITH CHECK VALVE PROTECTION

(75) Inventors: Daniel W. Aberle, Portland, OR (US); James H. Lenhart, Jr., Portland, OR (US)

(73) Assignee: Contech Stormwater Solutions Inc., West Chester, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/738,842

(22) Filed: Apr. 23, 2007

(65) Prior Publication Data

US 2007/0187307 A1   Aug. 16, 2007

Related U.S. Application Data

(63) Continuation of application No. 10/647,102, filed on Aug. 21, 2003, now Pat. No. 7,214,311, which is a continuation-in-part of application No. 09/990,564, filed on Nov. 20, 2001, now Pat. No. 6,649,048.

(51) Int. Cl.
*E02B 15/04* (2006.01)
*C02F 1/40* (2006.01)
*E03F 5/14* (2006.01)
*B01D 29/11* (2006.01)
*B01D 29/60* (2006.01)
*B01D 35/01* (2006.01)
*B01D 35/00* (2006.01)

(52) U.S. Cl. ............... 210/170.03; 210/120; 210/121; 210/123; 210/109; 210/263; 210/290; 210/429; 210/436; 215/307; 215/308; 215/309; 215/311; 217/74; 217/110

(58) Field of Classification Search ............ 210/170.03
See application file for complete search history.

(56) References Cited

U.S. PATENT DOCUMENTS

| 414,240 A | 11/1889 | Norton |
| 556,725 A | 3/1896 | Farwell |
| 598,191 A | 2/1898 | Wilcox |
| 1,371,110 A | 3/1921 | Pelphrey |
| 2,609,932 A | 9/1952 | Fricke |

(Continued)

OTHER PUBLICATIONS

"Removal of heavy metal from waste water—using dewatered and screened peat," *Agency of Ind. Sci. Tech*, 1973.
"The Radial Filter," *Aero Mod*, May 1993.

*Primary Examiner*—Krishnan S Menon
(74) *Attorney, Agent, or Firm*—Thompson Hine LLP

(57) ABSTRACT

A filter assembly is provided that includes a hood, a drain manifold, a filter disposed between the hood and the drain manifold, a drainage space that is disposed between and in fluid communication with both the filter medium and the drain manifold, a check valve that is configured to permit air to escape but not to enter the drainage space so that a siphon can be established that draws additional fluid through the filter medium and into the drain manifold, the siphon continuing until air entering the hood disrupts the siphon, and a check valve cap that is configured to permit air to escape the check valve while preserving an air-filled void above the check valve when the filter assembly is submerged.

13 Claims, 4 Drawing Sheets

U.S. PATENT DOCUMENTS

| | | |
|---|---|---|
| 3,306,448 A | 2/1967 | Baker |
| 3,522,013 A | 7/1970 | Borgeson |
| 3,572,014 A | 3/1971 | Hansen |
| 3,674,687 A | 7/1972 | Quase |
| 3,747,303 A | 7/1973 | Jordan |
| 4,032,457 A | 6/1977 | Matchett |
| 4,135,908 A | 1/1979 | Widmer |
| 4,334,900 A | 6/1982 | Neumann |
| 4,338,106 A | 7/1982 | Mizuno et al. |
| 4,364,825 A | 12/1982 | Connor, Jr. |
| 4,427,542 A | 1/1984 | Glover |
| 4,643,836 A | 2/1987 | Schmid |
| 4,826,029 A * | 5/1989 | Skoglie ................. 217/110 |
| 4,829,045 A | 5/1989 | Fransham |
| 4,838,901 A | 6/1989 | Schmidt et al. |
| 4,976,873 A | 12/1990 | Ross |
| 5,085,266 A | 2/1992 | Arold et al. |
| 5,133,619 A | 7/1992 | Murfae et al. |
| 5,193,709 A | 3/1993 | Brassel |
| 5,223,154 A | 6/1993 | MacPherson, Jr. et al. |
| 5,294,337 A | 3/1994 | Johnson |
| 5,296,293 A | 3/1994 | Jobst |
| 5,297,367 A | 3/1994 | Sainz |
| 5,316,589 A | 5/1994 | Krieger, Jr. |
| 5,322,629 A | 6/1994 | Stewart |
| 5,330,651 A | 7/1994 | Robertson et al. |
| 5,391,295 A | 2/1995 | Wilcox et al. |
| 5,419,838 A | 5/1995 | DiTuillio |
| 5,437,786 A | 8/1995 | Horsley et al. |
| 5,458,769 A | 10/1995 | Johannessen |
| 5,511,904 A | 4/1996 | Van Egmond |
| 5,549,817 A | 8/1996 | Horsley et al. |
| 5,573,349 A | 11/1996 | Paoluccio |
| 5,593,481 A | 1/1997 | Redner |
| 5,624,552 A | 4/1997 | Vales et al. |
| 5,624,576 A | 4/1997 | Lenhart et al. |
| 5,632,889 A | 5/1997 | Tharp |
| 5,649,639 A * | 7/1997 | Dolvet et al. ............. 220/257.1 |
| 5,683,577 A | 11/1997 | Nurse, Jr. |
| 5,707,431 A | 1/1998 | Verkaart et al. |
| 5,707,527 A | 1/1998 | Knutson et al. |
| 5,725,765 A | 3/1998 | Shen |
| 6,027,639 A * | 2/2000 | Lenhart et al. ............. 210/108 |
| 6,042,743 A | 3/2000 | Clemenson |
| 6,080,307 A | 6/2000 | Morris et al. |
| 6,099,723 A | 8/2000 | Morris et al. |
| 6,106,707 A | 8/2000 | Morris et al. |
| 6,143,172 A | 11/2000 | Rink et al. |
| 6,338,797 B1 | 1/2002 | Nurse, Jr. et al. |
| 6,649,048 B2 * | 11/2003 | de Ridder et al. .......... 210/106 |
| 7,214,311 B2 * | 5/2007 | Aberle et al. .......... 210/170.03 |

* cited by examiner

FILTER CARTRIDGE WITH CHECK VALVE PROTECTION

This application is a continuation of U.S. application Ser. No. 10/647,102 for FILTER CARTRIDGE WITH CHECK VALVE PROTECTION, filed Aug. 21, 2003, now U.S. Pat. No. 7,214,311 which is a continuation-in-part of U.S. application Ser. No. 09/990,564 for FILTER CARTRIDGE WITH REGULATED SURFACE CLEANING MECHANISM, filed Nov. 20, 2001, both of which are hereby incorporated by reference in their entirety.

TECHNICAL FIELD

The invention relates to apparatus for the treatment of water, particularly stormwater, to reduce levels of contaminants such as trash and debris, sediment, heavy metals, oils and greases, organic toxins, and the like. Specifically, the invention provides a modular filter assembly that is capable of using a wide variety of filtration materials to provide various levels of stormwater treatment.

BACKGROUND

Stormwater is pure rainwater plus any particulate debris and dissolved materials that the rainwater carries along with it. In urban areas, rain that falls on the roofs of houses, collects on paved areas like driveways, roads and sidewalks is typically diverted through a system of pipes that is separate from the sewerage system. Unlike sewage, stormwater was historically not treated, but flowed directly from streets and gutters into rivers, lakes and the ocean.

Stormwater can therefore be a form of diffuse or non-point source pollution. It can entrain pollutants, such as garbage, sediment, organic matter, heavy metals, and organic toxins, and flush them into receiving water bodies. As a consequence, natural bodies of water that receive stormwater may also receive pollutants capable of irreparable environmental harm.

The amount of stormwater pollution entering into such receiving bodies of water is related to the degree of urbanization in the surrounding area and the nature of the surrounding activities. Urbanization results in the covering of land with low-permeability structures, such as roadways, parking lots, and rooftops, which both generate large volumes of stormwater and accumulate pollutants. Since these types of surfaces do not allow rainfall to infiltrate, they allow the accumulated pollutants to be washed into stormwater drainage systems.

Prior to extensive human modification of the natural landscape, contaminated stormwater was not a significant problem. Rain fell on porous, natural surfaces where gradual percolation through the earth provided natural filtration before stormwater entered aquifers, streams, lakes, bays, and other natural water bodies. In addition, erosion due to excessive stormwater volumes was minimal and contaminants such as garbage, oil and grease, heavy metals, and organic chemicals were insignificant. In today's largely urban and industrial world, stormwater is a significant source of aquatic pollution.

In an effort to address the environmental problems posed by polluted stormwater, traps and filters for stormwater have been developed. U.S. Pat. No. 5,322,629 (hereby incorporated by reference) describes a method and apparatus for treatment of stormwater by vertical filtration through a bed of high-quality leaf compost material that removes pollutants prior to discharge into a receiving water body.

A granular form of compost that improves the overall performance of such filtration systems was described in U.S. Pat. No. 5,624,576 (hereby incorporated by reference). The permeability of a filter containing such granular compost is increased, and can be maintained for an extended period of time.

Extended filter permeability can be achieved by orienting the surface of the media bed vertically rather than horizontally, as described in U.S. Pat. No. 5,707,527 (hereby incorporated by reference). Vertical filter beds discourage the collection and storage of settled solids on the surface of the filter, which otherwise typically leads to "blinding" or surface loading, a rapid clogging of the outer surface of the filter. The use of a vertical filtration surface also facilitates the maintenance of the system both by keeping the bulk of the captured solids off of the media surface and by forcing the enclosure of the media into more manageable, engineered structures.

The improved filter apparatus described in U.S. Pat. No. 6,027,639 (hereby incorporated by reference) features a siphon-inducing mechanism and is somewhat "self-cleaning", thereby improving the operational life of the media bed. The filter apparatus of the '639 patent utilized a sealed upper housing that included a check valve for air evacuation within the housing. An induced siphon effect pulled stormwater through the filter until air was pulled through an air inlet along the lower perimeter of the housing, disrupting the siphon. It was intended that the air stream that resulted from such a siphon-breaking event would produce turbulence and thereby clean the filter. In particular, the filter apparatus of the '639 patent utilized a fabric filtration medium around the outside of the media bed to prevent particulates from clogging the media bed, and the periodic turbulence was intended to keep the fabric filter free of clogging particulates.

Unfortunately, although the filter basket of the '639 patent was an improvement over existing stormwater filter systems, it nevertheless possessed some shortcomings. The filter assembly typically featured a flush, circumferential air inlet along the lower perimeter of the filter housing, and the air streams that resulted upon breaking the siphon were therefore typically concentrated along a single highest portion of the lower perimeter of the filter housing. The resulting localized air stream resulted in the cleaning of only a single section of the fabric filter medium, rather than the entire filter surface. In addition, it was found that fabric filter media often suffered from rapid clogging. Filtered particulate matter could create rapid and persistent surface loading of the fabric filter, which was then exaggerated by the effects of a poorly functioning cleaning mechanism.

An improved self-cleaning stormwater filter apparatus was described in U.S. application Ser. No. 09/990,564 for FILTER CARTRIDGE WITH REGULATED SURFACE CLEANING MECHANISM, filed Nov. 20, 2001. The improved filter apparatus included a hood that incorporated a plurality of voids arranged in a horizontally-aligned array. As an established siphon effect drew stormwater through this improved filter assembly, the water surface elevation outside the hood eventually dropped to the level of the void array, disrupting or "breaking" the siphon. The horizontally-aligned voids in the filter hood were able to direct and regulate the size of the air streams rising in the space between the hood and the filter medium, agitating the outer screen and the surfaces of the filter medium. These turbulent air streams were better able to dislodge particulate matter from the filter surfaces that would otherwise clog the filter and/or slow filtration.

The filter assemblies described previously could occasionally be fully submerged by stormwater during the service life of the cartridges. For example, complete submergence of the filter assembly may be desirable where the available volume above the filter assemblies can be used to detain and store stormwater prior to filtration. Additionally, a greater hydraulic driving head through the cartridge permits greater flexibility in cartridge media selection. For example, more effective filtration may be achieved through the selection of finer filter media, which may require a greater hydraulic driving head.

While the check valve in the upper housing of the filter assembly allows the air trapped under the cartridge hood to purge to atmosphere, complete submergence of the filter assembly may allow stormwater to flow into the valve cavity as well. Particulates and other debris in the stormwater can then settle on the check valve seat and prevent the valve from functioning properly. A compromised check valve could permit air to enter the filter hood, preventing the establishment of the requisite siphon effect entirely, potentially disrupting the self-cleaning of the filter medium.

What is needed is a stormwater filter apparatus that helps minimize the likelihood of the check valve and check valve seat being fouled with debris during operation, and yet does not interfere with the operation of the filter assembly, or contribute additional mechanical complexity to the filter assembly.

SUMMARY

A filter assembly is provided that includes a hood, a drain manifold, a filter disposed between the hood and the drain manifold, a drainage space that is disposed between and in fluid communication with both the filter medium and the drain manifold, a check valve that is configured to permit air to escape but not to enter the drainage space so that a siphon can be established that draws additional fluid through the filter medium and into the drain manifold, the siphon continuing until air entering the hood disrupts the siphon, and a check valve cap that is configured to permit air to escape the check valve while preserving an air-filled void above the check valve when the filter assembly is submerged.

DETAILED DESCRIPTION

The disclosed filter assembly typically includes a removable filter media basket with a vertically oriented filtration surface. The filter media basket itself is contained within an external upper housing, cover, or hood with a circumferential plurality of air inlets or voids located near its lower perimeter. The hood is designed to house, and facilitate the horizontal filtration of stormwater through, a bed of filtration material or filter medium. The media basket has a permeable outer screen and a permeable inner drainage space that collects the filtered water after it passes through the filter medium. The filter medium allows fluid communication between the outside environment and the inner drainage space. An effluent manifold, or drain manifold, connects to the drainage space via a bushing, which both allows the flow of treated stormwater out of the filter assembly and typically serves as a component of the float valve assembly. This bushing serves as the connection point between the cartridge and a containment structure that houses one or more filter assemblies as described herein.

Figure 1:
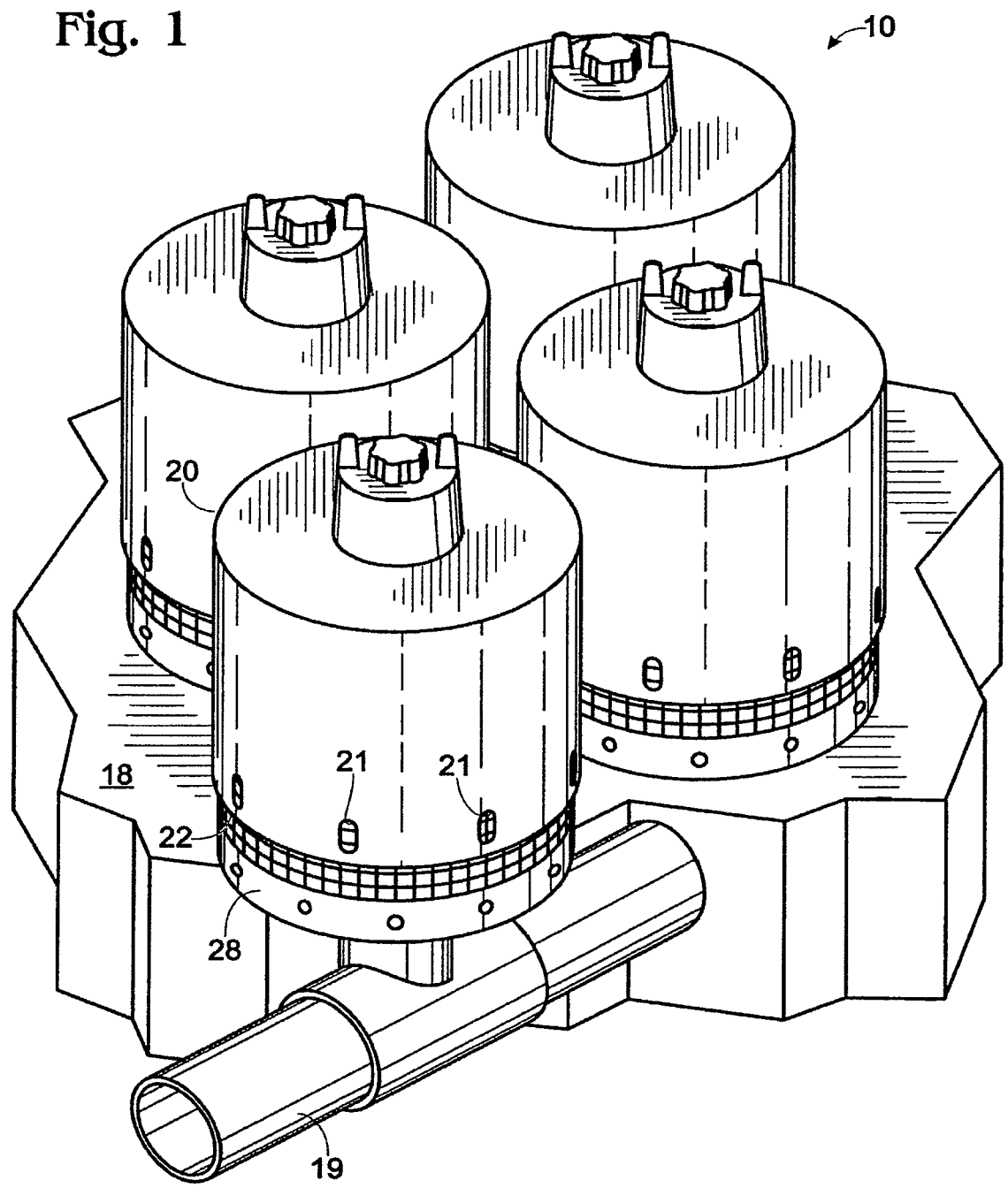
FIG. 1 is an isometric view of a manifold of filter assemblies of a first embodiment of the invention.

A manifold of filter assemblies 10 is shown in FIG. 1. The filter assemblies are typically housed in a containment structure 18 that is generally adapted to receive stormwater runoff from a stormwater drainage pipe, a parking lot, a street, or other surface. Typically, the containment structure includes a forebay that includes a storm water settling basin that facilitates settling of particulates and debris from the stormwater. The clarified stormwater overflows from the settling basin into a stormwater treatment zone where the filter assemblies are placed.

A given containment structure may contain only a single filter assembly, but more typically contains two or more filter assemblies. The drainage space of each filter assembly is in fluid communication with a drain manifold 19 that is generally embedded in the containment structure, as shown in FIG. 1. The drain manifold of each filter assembly typically leads to a common drainage conduit. The purified stormwater leaving the containment structure may be released into a receiving water body, or diverted to an additional treatment plant for further purification.

As discussed above, the filter assemblies may incorporate a regulated surface cleaning mechanism. Although not typically required, the filter assembly may be periodically backflushed in order to remove debris entrapped within the filter medium that are not removed by the regulated mechanism, thereby restoring the infiltration capacity of the basket. Backflushing is typically achieved by preventing the outlet valve of the basket from opening, connecting a water hose to the drainage space, and flowing water at a high rate into the drainage space so that the water is forced to flow in reverse to the normal flow path during use, i.e., outward through the filter medium. The backflush water may then be collected, for example, by vacuum truck, and removed. Should the filter medium become irreversibly clogged, or lose chemical or biological potency, the modular nature of the filter medium basket allows it to be readily removed and replaced.

Figure 2:
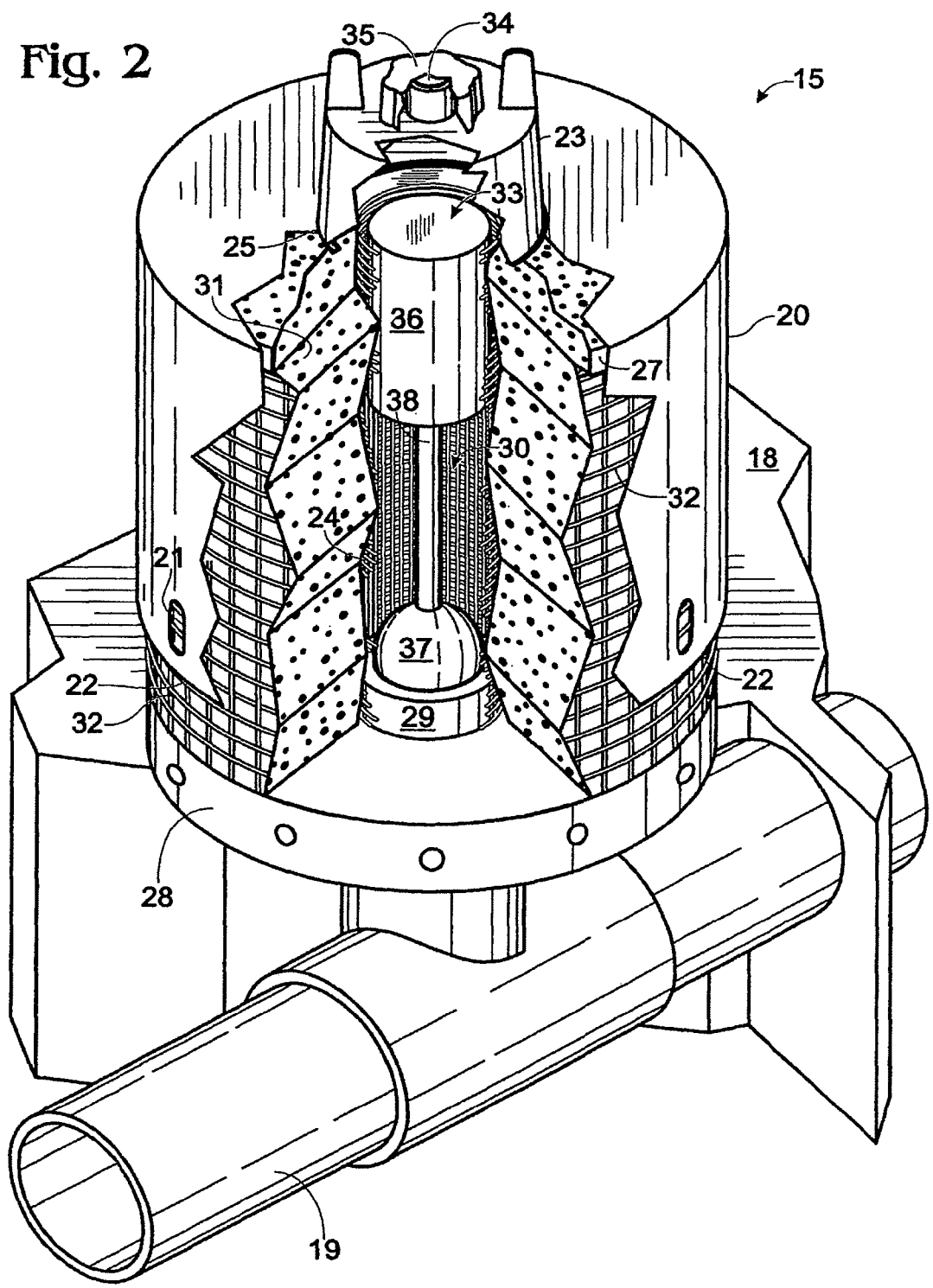
FIG. 2 is a partially sectioned isometric view of the first embodiment of FIG. 1.
Figure 3:
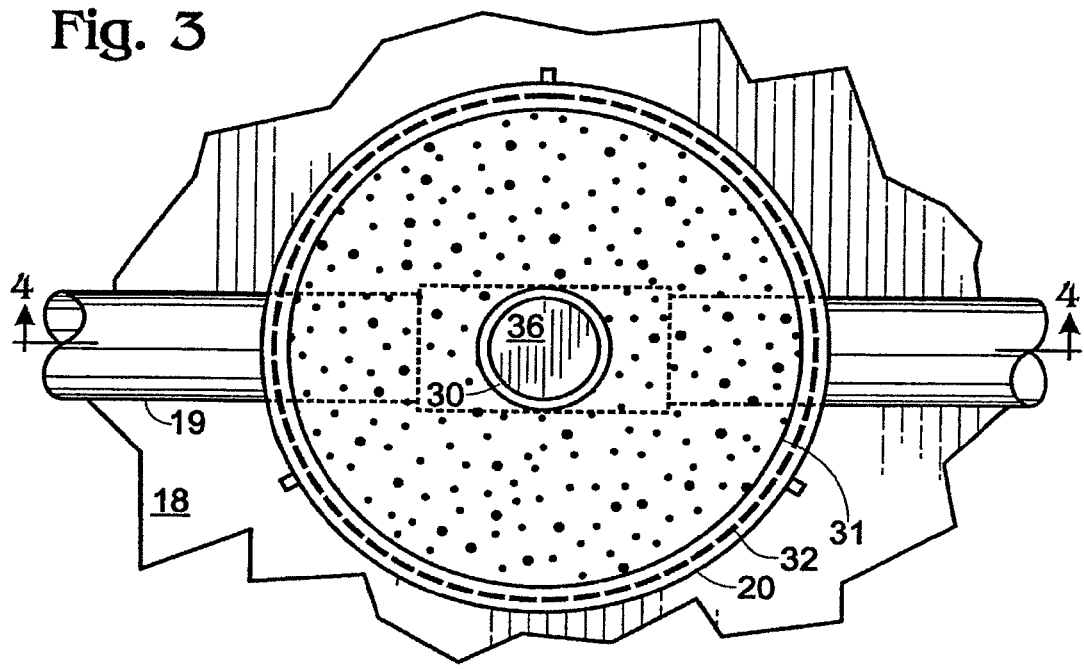
FIG. 3 is a sectional plan view of the embodiment of FIGS. 1 and 2 taken along line 3-3 of FIG. 4.
Figure 4:
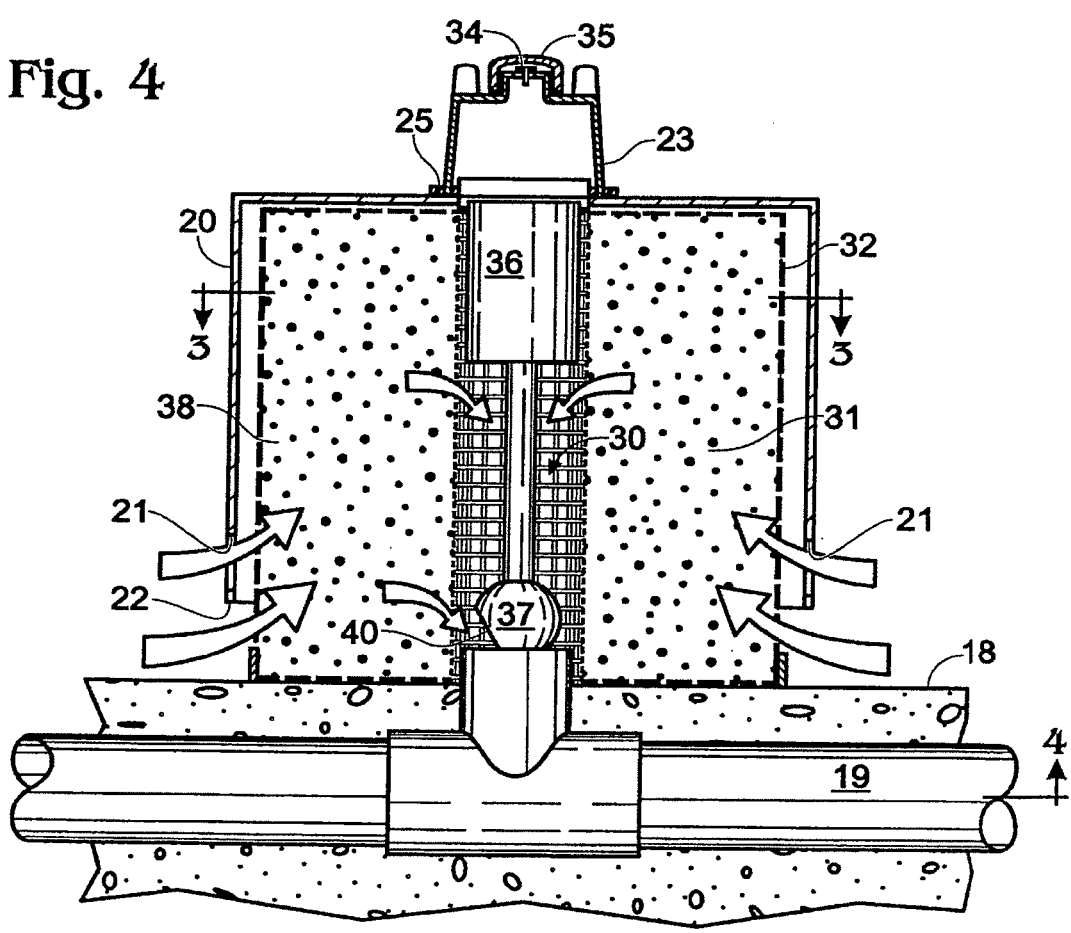
FIG. 4 is a side elevation sectional view of the embodiment of FIGS. 1-3, taken along line 4-4 of FIG. 3.

The filter assembly serves to channel stormwater through a filter medium, and facilitate efficient filtration of the stormwater. Such a filter assembly is shown in detail in FIGS. 2-4. The filter assembly 15 is defined and substantially enclosed by a hood 20 that optionally includes a plurality of voids 21 to enhance the regulated surface cleaning of the filter medium. The voids may be arranged in a horizontally-aligned array within the material of the hood, for example near a lower edge 22 of hood 20.

Hood 20 is attached to the filter assembly via an inner drainage space cap 23, which engages an upward-extending end of an inner drainage space screen 24, that extends through the center of hood 20. The connection between the inner drainage space cap 23 and the hood 20 is sealed through the use of a hood gasket 25 of an appropriate sealing material, such as neoprene rubber. Hood 20 may be attached to an outer screen support screen 27 using one or more mechanical fasteners. Such fasteners may be seated against the hood so that an airtight seal is developed. Alternatively, the hood is secured satisfactorily by the inner drainage space cap, and additional perforations of the hood are minimized or eliminated.

The components of the filter assembly are supported by a base 28 (a circular base in the case of a cylindrical filter assembly) of water-impermeable material, preferably plastic.

This base 28 is seated over a bushing 29 that serves as the connection point between the filter assembly and the drain manifold 19, this bushing 29 being in fluid communication with the inner drainage space 30, that is in turn in fluid communication with a filter medium 31 that is disposed in an annular space surrounding the inner drainage space 30. The filter medium is bounded by an outer screen 32 that is connected to the base 28 and supported at its upper extremity by the outer screen support ring 27, and inner drainage space screen 24 that defines the inner drainage space.

The drain manifold 19 incorporated in the cartridge containment structure 18 connects vertically to the base of the inner drainage space 30 via the bushing 29, which both allows the flow of treated stormwater out of the cartridge and serves as a component of a float valve assembly 33. This bushing serves as the connection point between the filter assembly 15 and the containment structure 18. The inner drainage space cap 23 contains a mechanism to promote the development of a siphon by permitting air to be expelled from beneath the hood but preventing air from flowing back into the housing via the inner drainage space cap 23. This mechanism is typically one of a variety of one-way check valve designs. In a preferred embodiment, check valve 34 is an umbrella-type check valve that is installed atop the inner drainage space cap 23 and shielded by a check valve cap 35. Check valve cap 35 surrounds and protects the check valve from stormwater, as discussed in greater detail below.

The filter assembly generally relies on hydraulic pressure to force water through the filter medium and the filter assembly is therefore at least partially submerged in stormwater during normal operation. As shown by the arrows in FIG. 4, stormwater enters the filter assembly, infiltrates radially inward through the outer screen 32 and filter medium 31, and into the inner drainage space 30 for removal via the drain manifold 19. Filtration occurs as the water is strained through, and comes into contact with, the filter medium.

The filter medium or media are selected to efficiently remove contaminants by physical filtration. Additionally, the filter medium or media may be selected to remove contaminants through mechanical action, chemical action, biological action, or by any suitable combination thereof. In one aspect, a screen such as outer screen 32 is a satisfactory physical filter without the presence of additional filter media. The filter assembly may be capable of high throughput, rapidly screening debris from large volumes of stormwater. Alternatively, the filter includes outer screen 32 and one or more types of filter medium that is selected for finer filtration, for appropriate chemical reactivity, or appropriate biological activity. Mixtures of different media types are optionally used to provide advantageous combinations of filtering ability.

The filter medium may be selected to remove heavy metals, oils and greases, organic toxins, and other contaminants that stormwater typically accumulates when flowing over paved areas in residential or industrial communities before entry into a stormwater drainage system. Alternatively, or in addition, the filter medium is selected to remove total or dissolved phosphorous or nitrogen from stormwater. Selected media include, without limitation, organic compost, vermiculite, activated carbon, peat, zeolite, perlite, diatomaceous earth, clay minerals, commercial ion exchange resins, catalyst-infused resins, silica sand, iron-infused media, or mixtures of these. The filter medium may be in the form of granules or pellets. Large granules provide the advantage of maintaining a high flow rate through the treatment bed by minimizing clogging of the bed that might otherwise arise from the accumulation of fine particulate debris. Alternatively, fine granules provide enhanced filtration of fine debris. The selection of pellet or granule size depends on the desired level of physical straining and treatment.

Although not typically preferred, the filter assembly optionally includes a cloth or paper filter, including pleated filters. The use of a cloth or paper filter either outside of or within the filter medium basket may be used to capture extremely fine particulates during filtration.

The flow of filtered water into the drain manifold is controlled by a float valve assembly 33 that includes a buoyant float 36, a float valve body 37, and a linkage 38 joining the float to the float valve body. Bushing 29 contains an orifice against which the float valve body 37 seats. The float valve assembly 33 impedes the passage of water via the bushing 29 when the float valve assembly is in its first, or lower, position.

Float valve body 37 is typically designed such that the seal between it and the bushing 29 is imperfect and causes the float valve assembly to leak. This is accomplished through a variety of modifications to either the float valve body 37 or bushing 29 such that a perfect seal between the bushing and the float valve assembly is not possible. In one embodiment, imperfections in the float valve body due to manufacturing processes result in sufficient fluid flow into the drain manifold for efficient operation. Where the float valve body is manufactured to higher tolerances, a notch or depression may be formed in bushing 29 that prevents a watertight seal. In a more preferred embodiment, a slight relief 40 may be molded into float valve body 37 to prevent a perfect seal against bushing 29. Relief 40 may be a notch in the float valve body, or simply a flat spot in the otherwise typically spherical surface of the float valve body. Any relief mechanism that provides sufficient fluid flow into the drain manifold is an adequate relief mechanism for the filter assembly described herein.

When float valve assembly 33 is in the normal (lower) position, stormwater entering the filter assembly displaces air beneath the hood 20 through check valve 34 that is in fluid communication with the inner drainage space 30. Float valve body 37 does not block the flow of fluid into the drain manifold, but restricts the flow of fluid into the drain manifold to a first (slow) rate of fluid flow. This first rate of fluid flow insures that the containment structure does not accumulate standing water, such as may create a health hazard. Even a small amount of water in the containment structure is filtered and flows into the drain manifold. However, during an increase in stormwater flows, for example due to sudden or severe rainfall, the filter assembly may utilize an additional filtration mechanism.

During periods of increased flow, stormwater accumulates in the containment structure faster than the first rate of filtration can accommodate, and the level of stormwater in the containment structure increases. When the level of fluid within the hood increases to a predetermined depth during filtration, the buoyancy of float 36 causes float valve assembly 33 to lift valve body 37 free of bushing 29 and thereby permits a second increased rate of fluid flow from inner drainage space 30 into drain manifold 19. As the flow of fluid into the drain manifold increases beyond the rate of fluid flow into the inner drainage space, a negative air pressure inside the filter assembly is created, and one-way check valve 34 closes. As outside air cannot enter the hood of the filter assembly via the check valve, a standing column of water is established beneath the hood, drawing stormwater through the entirety of the filter medium as filtered water leaves by way of the drainage space 30.

In one aspect the filter assembly does not include a float valve assembly, and consequently the rate of fluid flow into the drain manifold is determined by selection of an appropriately sized opening into the drain manifold. Filtration occurs as described above, and the siphon effect is created when the rate of fluid flow from the inner drainage space into the manifold is greater than the rate of fluid flow from the containment structure into the filter assembly, thereby creating a negative pressure beneath the hood and closing the check valve.

Once established, the siphon effect continues to draw stormwater through the filter assembly until the water surface elevation outside the hood drops to the level of the surface cleaning regulation voids 21, when present, typically located along lower perimeter 22 of hood 20. The pressure differential between the outside and the inside of the hood then causes outside air to be drawn beneath the hood to equalize the pressure, disrupting or "breaking" the siphon.

The horizontally-aligned voids 21 along the lower perimeter 22 of the hood 20 direct and regulate the size of the air streams that turbulently rise in the space between the hood and filter medium 31. In particular, these turbulent air streams agitate outer screen 32 and the surfaces of the filter medium 31 and dislodge particulate matter that has accumulated on these surfaces during filter operation. This dislodged particulate matter is then flushed from beneath the hood and allowed to settle onto the floor of containment structure 18, where it is stored until it is removed at a suitable maintenance interval. By cleaning the surface of outer screen 32 and the outer surfaces of filter medium 31, the turbulent air streams prevent surface loading and maintain the high surface permeability of the filter medium.

As the siphon effect is disrupted, the water surface elevation beneath the hood drops to the vicinity of the lower perimeter of the hood 20. At this point float valve body 37 re-seats itself against bushing 29 and the entire filter assembly returns to the first, reduced rate of water filtration.

Figure 5:
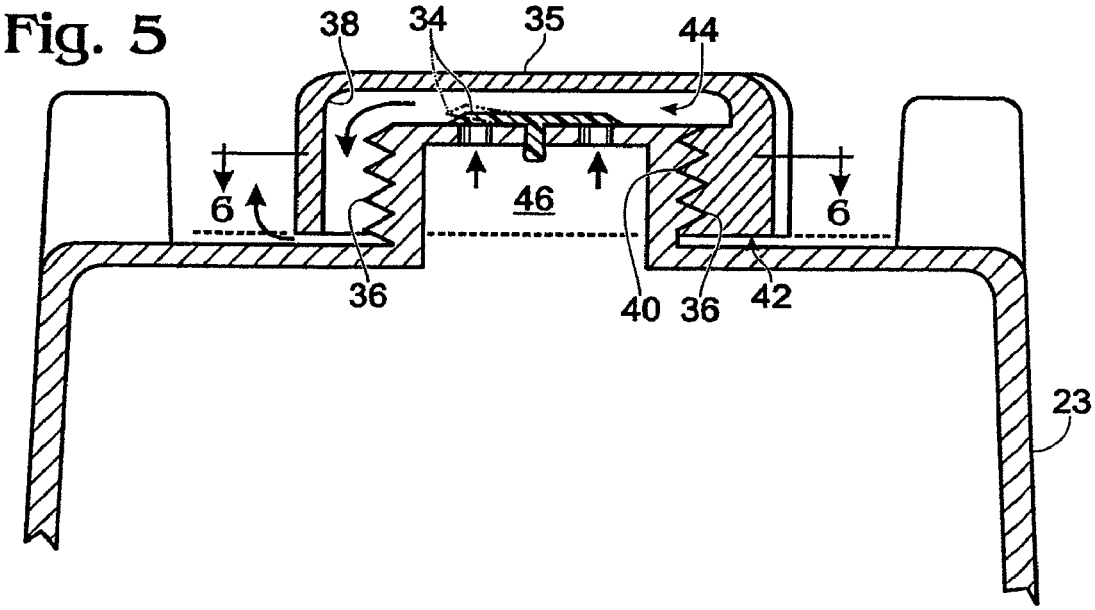
FIG. 5 is a partial side elevation sectional view of the embodiment of FIGS. 1-4, taken along line 5-5 of FIG. 6, showing the check valve cap.
Figure 6:
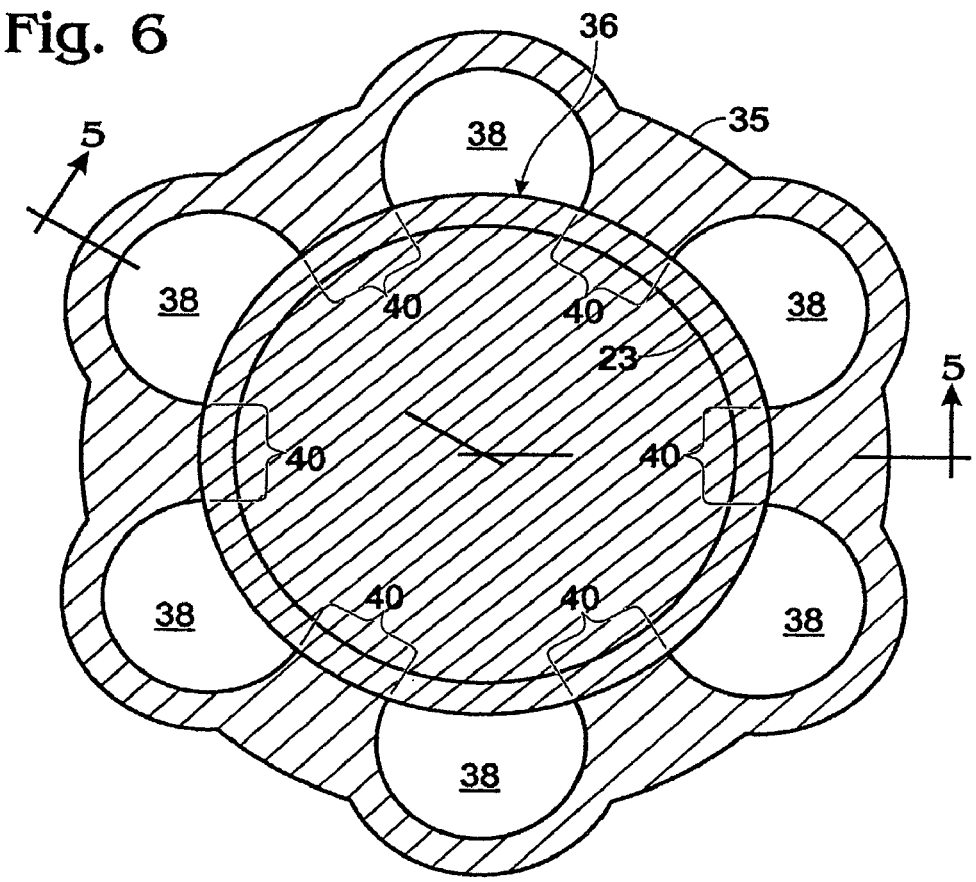
FIG. 6 is a sectional plan view of the check valve cap of FIG. 5, taken along line 6-6 of FIG. 5.

As discussed above, and as shown in more detail in FIGS. 5 and 6, check valve cap 35 surrounds and protects check valve 34 from stormwater. Check valve 34 is located at the top of inner drainage space cap 23, and engages a threaded portion 36 of the inner drainage space cap. The check valve cap includes one or more channels 38 formed on the interior surface of the cap. Channels 38 permit the air escaping from beneath the filter hood via the check valve to escape from beneath cap 35, as indicated by the arrows in FIG. 5. The inner surface of the check valve cap also includes threaded regions 40 that are complementary to threaded portion 36 and that secure the check valve cap to the inner drainage space cap. Channels 38 in the check valve cap are configured so that even when the check valve cap is tightly engaged to the inner drainage space cap, the channels are unobstructed.

Since the lower lip 42 of the check valve cap lies below the level of the check valve, the air trapped beneath the check valve cap cannot be displaced by water, even if the filter assembly is submerged. The resulting air-filled void 44 above the check valve helps prevent stormwater from contacting the check valve and valve seat, and therefore minimizes the likelihood of fouling of the valve by particulates and other debris that may be found in stormwater. The check valve cap also creates an additional air-filled void 46 under the check valve and within the inner drainage space cap, similarly preventing even filtered stormwater from contacting the check valve.

It should be appreciated that where the filter assembly is submerged beneath a substantial depth of water, hydraulic compression may decrease the size of the air-filled voids 44 and 46 that surround the check valve. However, the depth capacity provided by a given check valve cap may be readily calculated. Pressure-volume relationships of gases are often expressed using the Ideal Gas Equation, or PV=nRT, where P is Pressure, V is Volume, n is the number of moles of gas, R is the gas constant, and T is Temperature. For the purposes of calculating the effect of water depth on the air-filled voids, small changes in temperature will have a negligible effect on the pressure-volume relationship, and the equation can be simplified to a statement of Boyles law: $P_i V_i = P_f V_f$, that is, the product of the initial pressure and initial volume will be equal to the product of the final pressure and volume. The initial pressure will typically be equal to ambient pressure, and the initial volume is equal to the entire air volume under the check valve cap, or the combination of voids 44 and 46, and is therefore readily measured. The smallest permissible final volume that will be sufficient to prevent stormwater from contacting the check valve may be either measured directly, or calculated.

For example, the final volume ($V_f$) may be set equal to the smallest acceptable water-free volume beneath the check valve cap. Using Boyle's law, a corresponding maximum permissible pressure for that check valve cap configuration can be calculated. Using water depth/pressure correlation values, the maximum allowable depth of submergence of the resulting filter assembly may be determined. Using similar methods, an appropriate check valve cap may therefore be selected or designed for any particular installation configuration, so that the stormwater depth likely to be encountered at that installation site does not exceed the ability of the check valve cap to protect the check valve.

It should be appreciated that a variety of possible designs exist for the check valve cap described herein. The channels in the check valve cap may be open to the interior of the cap, or may be partially or fully enclosed within the material of the cap itself. The channels may vary in size and/or number. The check valve cap may engage the interior drainage space cap with threads, latches, adhesive, or any other appropriate engagement mechanism. Typically, the check valve cap is configured so that it may be quickly and easily installed and/or replaced without removing the filter assembly from its installation site. The check valve cap may be formed from a strong and durable plastic or metal. For example, the check valve cap may be formed from ABS (Acrylonityile Butadiene Styrene), PVC (PolyVinyl Chloride), nylon, polycarbonate, polyurethane, or any other suitable plastic. In general, any check valve cap that permits air to be expelled from the check valve while still providing an air space above the check valve when submerged is an appropriate check valve cap for the purposes of the filter assembly disclosed herein.

The filter assemblies described herein provide significant advantages over previously described massive, horizontal bed units in terms of ease of maintenance, space required, and service life, primarily on account of the modular design of the overall filter apparatus. Instead of a single, monolithic bed of media that must be completely serviced on site, the filter assemblies and used filter media can be quickly removed for off-site service and immediately replaced. Thus, rather than requiring a large workforce to service the system in place, the service of the filter basket and media can be performed at an off-site facility. In terms of space requirements, the use of the instant filter assemblies result in a greater area of filter surface within a given horizontal area than can be produced using a horizontal bed, which in turn increases service life by increasing the potential of surface loading capacity. Service life is further increased since the surface of the filtration media is vertically oriented, thus avoiding the storage of filtered debris on the sensitive filter surface. Additionally, the siphon-induced, surface cleaning mechanism also prolongs the lifetime of the filter medium. Thus the instant stormwater filters are easier to maintain, provide a greater amount of filter surface area per unit of horizontal space, and resist surface loading longer than horizontal bed units.

In particular, the check valve cap described above does not represent increased mechanical complexity, unlike elaborate snorkels, air manifold systems, or similarly mechanically complex and expensive alternatives. The check valve cap allows air, as well as any condensation in the system, to purge from the filter assembly without adding system cost or degrading maintenance access. The check valve cap's air-filled voids prevent stormwater from contacting the check valve and valve seat and, therefore, minimizes valve fouling. As a result, the valve seats more reliably and maintains a standing column of water under the hood even as the water surface elevation outside of the hood recedes, preserving the self-cleaning action of the filter assembly.

Although the present invention has been shown and described with reference to the foregoing operational principles and preferred embodiments, it will be apparent to those skilled in the art that various changes in form and detail may be made without departing from the spirit and scope of the appended claims.

For example, the invention is not limited to cylindrical filter assemblies having radial water flow, but includes filter assemblies having a variety of shapes and filter configurations, including square, rectangular, or semicircular filter assemblies. The drainage space is not limited to being configured within the filter medium, but may be located on the opposite side of a generally planar filter medium from the stormwater inlets in the filter hood.

Additionally, a variety of mechanisms may function as one-way check valves, and a variety of valve mechanisms exist for metering the flow from the drainage space into the drain manifold. For example, the float valve assembly may be located outside of the filter assembly entirely, rather than exclusively placed within the annular filter medium. Where the float valve assembly is external of the filter assembly, a single float valve may regulate the rate of flow into the drain manifold for a plurality of individual filter assemblies.

The present invention is intended to embrace all such alternatives, modifications and variances which fall within the scope of the appended claims.

What is claimed is:

1. A filter cartridge for removing pollutants from stormwater, comprising:
   a housing having a water inlet and a filtered water outlet;
   a filter medium disposed along a flow path between the water inlet and the filtered water outlet;
   a drainage space that forms at least part of the flow path and that is disposed between a downstream side of the filter medium and the filtered water outlet;
   a check valve that is configured to permit air to escape but not to enter the drainage space, such that a negative pressure can be established in the housing that draws fluid through the filter medium, the negative pressure continuing until air enters the housing to disrupt the negative pressure; and
   a check valve cap that is configured to permit air to escape the check valve while preserving an air-filled void above the check valve when the filter cartridge is submerged in stormwater.

2. The filter cartridge of claim 1, where the check valve cap is further configured to preserve an air-filled void beneath a level of the check valve when the filter cartridge is submerged.

3. The filter cartridge of claim 2, where the check valve cap has a lower lip that is disposed below the level of the check valve.

4. The filter cartridge of claim 3, where the check valve cap has an interior surface that includes at least one channel configured to permit air to escape from beneath the check valve cap.

5. The filter cartridge of claim 1, wherein the housing includes a substantially vertical wall having a lower horizontal edge, and the negative pressure can continue until air enters the housing under the lower horizontal edge of the substantially vertical wall.

6. The filter cartridge of claim 1, further comprising a float valve assembly within the housing for allowing more water to flow from the drainage space to the outlet when the housing fills with water and the valve is opened.

7. The filter cartridge of claim 1, wherein the filter cartridge is installed in a containment structure that is connected to receive stormwater runoff.

8. A filter cartridge for removing pollutants from stormwater, comprising:
   a housing having a water inlet and a filtered water outlet;
   a filter medium disposed within the housing;
   a one-way check valve that is configured to permit air to escape the housing, such that a negative pressure can be established in the housing that draws water through the filter medium; and
   a check valve cap that is configured to permit air to escape the one-way check valve while preserving the one-way check valve in an air-filled void when the filter cartridge is submerged in stormwater.

9. The filter cartridge of claim 8, where the check valve cap is further configured to preserve an air-filled void beneath a level of the check valve when the filter cartridge is submerged.

10. The filter cartridge of claim 9, where the check valve cap has a lower lip that is disposed below the level of the check valve.

11. The filter cartridge of claim 10, where the check valve cap has an interior surface that includes at least one channel configured to permit air to escape from beneath the check valve cap.

12. The filter cartridge of claim 8, wherein the housing includes a substantially vertical wall having a lower horizontal edge, and the negative pressure can continue until air enters the housing under the lower horizontal edge of the substantially vertical wall.

13. The filter cartridge of claim 8, further comprising a float valve assembly within the housing for allowing more water to flow from the drainage space to the filtered water outlet when the housing fills with water and the valve is opened.

* * * * *